United States Patent [19]

Probst et al.

[11] 4,014,964
[45] Mar. 29, 1977

[54] PROCESS FOR MAKING METAL POWDER USING A LASER

[75] Inventors: Robert L. Probst, Ann Arbor, Mich.; Barry P. Fairand, Columbus, Ohio

[73] Assignee: Federal-Mogul Corporation, Southfield, Mich.

[22] Filed: July 16, 1975

[21] Appl. No.: 596,402

[52] U.S. Cl. .......................... 264/10; 219/121 LM
[51] Int. Cl.² ............................................. B01J 2/02
[58] Field of Search ........... 264/5, 10; 219/121 LM

[56] References Cited
UNITED STATES PATENTS

| | | | |
|---|---|---|---|
| 3,313,608 | 4/1967 | Guyer et al. | 264/10 |
| 3,415,636 | 12/1968 | Upton | 219/121 LM |
| 3,869,232 | 3/1975 | Ruus et al. | 264/5 |

*Primary Examiner*—Robert F. White
*Assistant Examiner*—James R. Hall
*Attorney, Agent, or Firm*—Harness, Dickey & Pierce

[57] ABSTRACT

A process for producing high purity metal powders in which a metal or metal alloy of the desired composition is molten and introduced into a chamber in the form of a stream of a controlled cross sectional area which is fragmentized into a plurality of molten droplets by the impingement of a transversely excited laser having a preselected power to achieve the desired magnitude of fragmentation. The resultant droplets are cooled during their free-fall through the chamber and the solidified metal powder is subsequently recovered from the bottom of the chamber.

9 Claims, 5 Drawing Figures

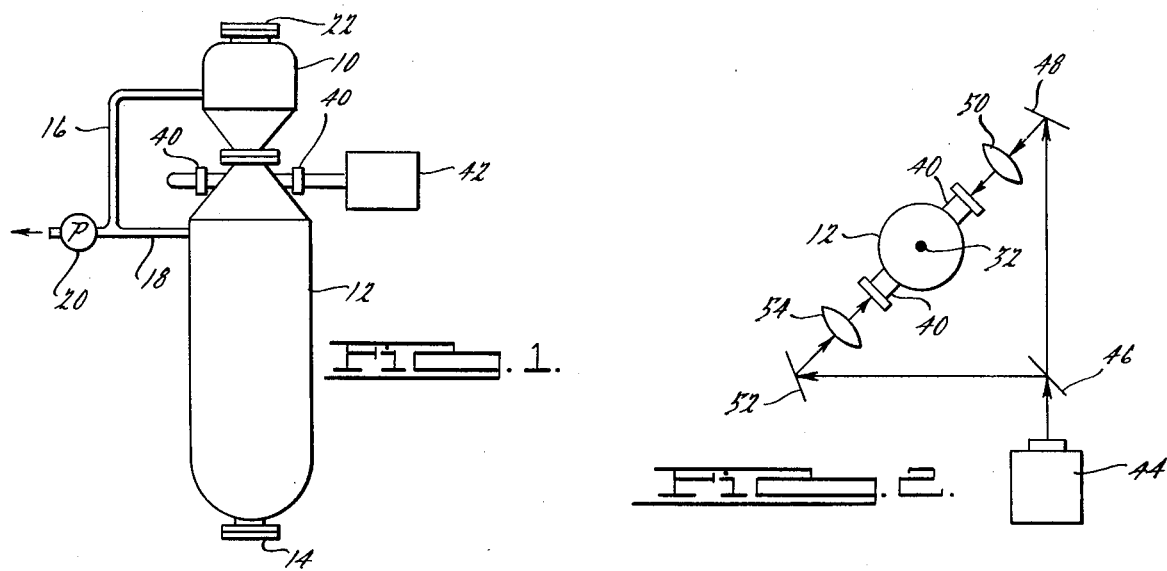
Fig. 1.
Fig. 2.
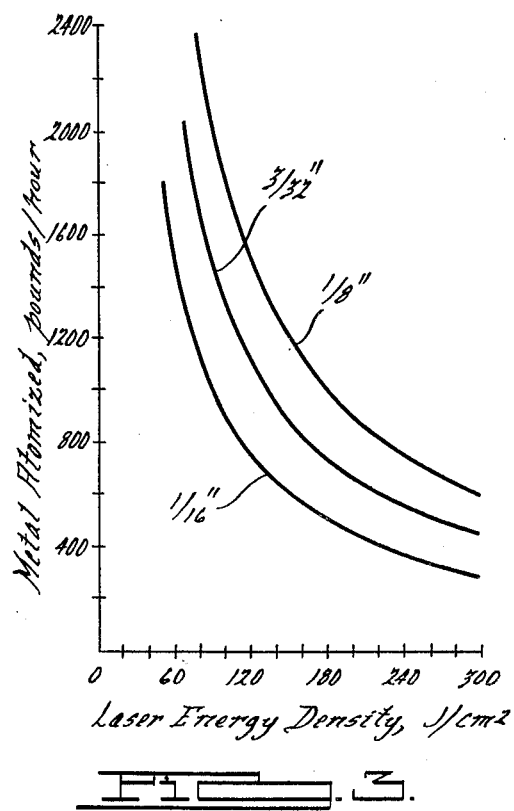
Fig. 3.
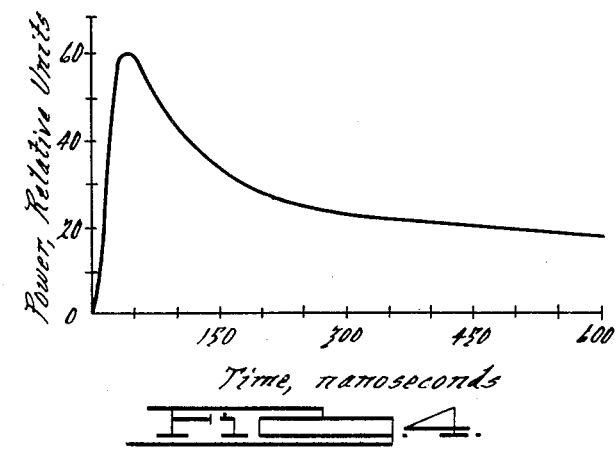
Fig. 4.
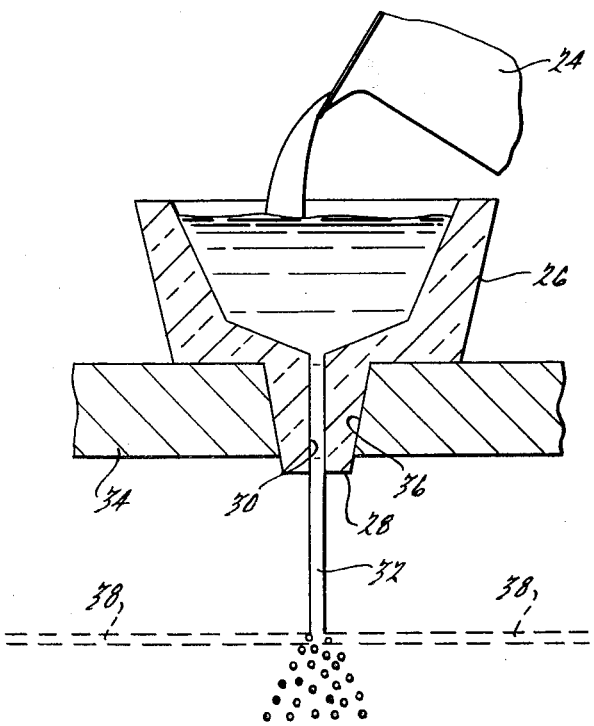
Fig. 5.

PROCESS FOR MAKING METAL POWDER USING A LASER

BACKGROUND OF THE INVENTION

A variety of apparatuses and techniques have heretofore been used or proposed for use to effect a microcasting or atomization of molten metals and metal alloys into metal powders of the required purity and particle size, rendering them suitable for use in the fabrication of various components employing conventional powder metallurgical techniques. Such prior art techniques include liquid atomization, gas atomization, as well as centrifugal spin microcasting techniques to fragmentize molten metals into droplets, which upon solidification can be recovered and screened to provide metal powders of the desired particle size range.

Typical of a liquid atomization apparatus particularly suitable for making copper and copper-lead alloy powders is that disclosed in U.S. Pat. No. 2,460,993, granted to Gordon J. LeBrasse et al. on Feb. 8, 1949, entitled "Apparatus for Atomizing Metal". Similarly, gas atomization apparatuses typical of those heretofore employed are disclosed in U.S. Pat. No. 2,968,062, granted to Robert L. Probst et al. on Jan. 17, 1961, for "Atomizing Nozzle and Pouring Cup Assembly for the Manufacture of Metal Powders", and U.S. Pat. No. 3,253,783, granted to Robert L. Probst et al. on May 31, 1966, for "Atomizing Nozzle". The devices and techniques as disclosed in the aforementioned United States patents, which are assigned to the same assignee as the present invention, have provided a satisfactory means for producing metal and metal alloy powders of the desired size and degree of purity at commercially acceptable costs. In the atomization of superalloys where metal powders of extremely high purity are required, it is usually necessary to employ inert gases to avoid oxidation attack of the reactive alloy elements therein such as titanium and/or aluminum, whereby the resultant powder contains less than about 100 parts per million (ppm) oxygen, rendering such powders eminently suitable for the fabrication of components having excellent high temperature mechanical properties, such as required in the rotating components in the hot section of aircraft gas turbine engines and the like.

Some problems have been encountered in controlling the fluid atomization process so as to provide a high yield of a metal powder product of the desired size range without producing excessive quantities of unuseable fines and larger irregular-shaped particles that must be recycled. For these and other reasons, there has been a continuing need for an improved technique for producing metal powders which are of high purity and wherein the microcasting can be controlled so as to maximize the yield of powder product having the desired particle size range and configuration.

The process of the present invention provides an improved technique for microcasting metals and metal alloys and can be practiced in an environment substantially devoid of any contaminating substances, such as in a substantial vacuum, and further enables careful control of the fragmentation process to achieve improved yields of metal powder of the desired particle size range.

SUMMARY OF THE INVENTION

The benefits and advantages of the present invention are achieved by a process in which a metal or metal alloy of the desired composition is molten and introduced into an atomization chamber in the form of a substantially continuous or controlled interrupted stream having a controlled cross sectional area and which is fragmentized by directing a transversely excited laser in impinging relationship against the stream. The pulse rate of the laser, as well as its power, is controlled so as to effect the desired degree of fragmentation and, accordingly, the desired size of the molten droplets produced. The molten droplets cool and solidify during their free-fall toward the base of the atomization chamber, whereafter they are recovered and screened, producing a high purity metal powder of a desired particle size range.

Additional benefits and advantages of the present invention will become apparent upon a reading of the description of the preferred embodiments taken in conjunction with the accompanying drawing.

BRIEF DESCRIPTION OF THE DRAWING

FIG. 1 is a fragmentary side elevational view somewhat schematic illustrating a typical arrangement of the components of a laser atomization apparatus in accordance with the practice of the present invention;

FIG. 2 is a schematic plan view illustrating the arrangement of the transversely excited atmospheric pulsed $CO_2$ laser providing two beams for fragmentizing the molten metal stream;

FIG. 3 is a graph depicting a general relationship between the laser energy density required for atomizing varying quantities of metal powder per unit time in relationship to the diameter of the molten metal stream;

FIG. 4 is a graph depicting the power profile of a laser pulse in relationship to time; and FIG. 5 is a fragmentary transverse sectional view illustrating a typical pouring cup assembly for introducing the molten metal in the form of a stream into the atomization chamber for fragmentation by the laser.

DESCRIPTION OF THE PREFERRED EMBODIMENTS

Referring now in detail to the drawing, and as may be best seen in FIG. 1, a suitable arrangement of a laser atomization apparatus for the practice of the present invention is illustrated and comprises a melt chamber 10 mounted in sealing relationship on the upper end of an elongated vertically extending atomization chamber 12 which is formed with a removable hatch 14 in the base thereof for extracting the collected metal powder product at the completion of the atomization operation. The melt chamber and atomization chamber 12 are preferably connected by vacuum lines 16, 18 to a vacuum pump 20 for evacuating the interiors thereof prior to initiation of the atomization operation. It is also contemplated that the interiors of the melt and atomization chambers can be filled with an inert gas, such as argon for example, or air, depending on the nature of the metal or metal alloy and the desired purity and permissible oxygen content of the metal powder product. In accordance with the preferred practice, the atomization chamber is purged with an inert gas and then evacuated to provide a vacuum of less than about 1 Torr. The melt chamber 10 is formed with a removable hatch 22 at the upper end thereof for loading the metal or metal alloy to be atomized in the form of briquettes into a suitable induction-heated crucible preparatory to the atomization operation.

As best seen in FIG. 5, the molten metal to be atomized is poured from a crucible 24 into a suitable ceramic pouring cup or tundish 26 formed with an elongated stem portion 28 having an axially extending aperture 30 through which the molten metal flows, forming a substantially continuous stream, indicated at 32, having a desired cross sectional area. The base of the pouring cup 26 is supported on a plate 34 secured to the base of the melt chamber, which is formed with a tapered port 36 for receiving the stem 28 of the pouring cup. As shown in FIG. 5, the molten stream 32 moves downwardly through the influence of gravity and is fragmentized by a pair of diametrically disposed laser beams 38 into a plurality of droplets which free-fall through the atomization chamber 12 and progressively solidify and are collected as the metal powder product from the base of the chamber. The laser beams 38 are introduced into the upper end portion of the atomization chamber, as best seen in FIG. 1, by two diametrically disposed ports 40, which are adapted to receive a high-energy pulsed $CO_2$ laser beam from a generator indicated at 42.

A schematic arrangement of the elements of a transversely excited atmospheric pulsed $CO_2$ laser is shown in FIG. 2 relative to the atomization chamber and the molten metal stream therein. The use of a laser of the foregoing type pulsed at a controlled rate and having a controlled power has been discovered to provide a satisfactory degree of fragmentation of the molten metal stream by efficiently coupling the power of the laser to the stream so as to effect a fragmentation thereof rather than simply superheating and vaporizing the metal. In accordance with the arrangement shown in FIG. 2, a transversely excited atmospheric pulsed $CO_2$ laser generator, indicated at 44, emits a beam which is directed against a beam splitter 46, which substantially equally divides the beam into two components. The first component passes through the beam splitter 46 and is reflected by a copper mirror 48 through a focusing lens 50, and thereafter enters one of the ports 40 for impingement against the molten metal stream, indicated at 32, in the center of the atomization chamber 12. The second portion of the split laser beam is reflected to a second copper mirror 52, which reflects it through a second focusing lens 54, whereafter the focused beam passes into the second port 40 for impingement against the molten stream 32.

In accordance with the foregoing arrangement, appropriate control of the pulse rate and power of the laser beam in consideration of the configuration and cross sectional area of the liquid stream provides a fragmentation or atomization of the molten metal into droplets which maximize the yield within a desired particle size range. It is also contemplated that other gas and solid state lasers now existing or under development can be employed in place of the $CO_2$ laser, both pulsed and continuous. It is also contemplated that in lieu of a substantially circular liquid stream, such as the stream 32 illustrated in FIG. 5, alternative molten metal streams, including a curtainous stream or a plurality of streams disposed in side-by-side relationship, can be employed to provide the desired capacity of metal powder production and the desired particle size. Generally, smaller particle sizes are obtained when the metal stream cross sectional area is reduced, such as for example, a metal stream of about 1/16 inch diameter. Orifices of a size to produce a metal stream having a cross sectional area of about 0.0003 to about 1 square inch can be employed. The pulse rate of the laser may be varied dependent upon the stream size, configuration and the particular density and physical characteristics of the metal being fragmentized. It is also contemplated that in lieu of a continuous molten stream of metal, the stream can be intermittent, comprising a plurality of individual free-falling sections passing through the point of impact of the laser beams.

FIG. 3 depicts a typical relationship of the laser energy density expressed in terms of Joules per square centimeter required for producing varying amounts of metal powder expressed in terms of pounds per hour in relationship to the diameter of circular molten streams of the metal being atomized. FIG. 4, on the other hand, depicts a typical power profile of a laser pulse from its initiation over a period of 600 nanoseconds. The profile of the laser pulse as depicted in FIG. 4 is substantially constant as long as the same laser gas mixture is employed and the magnitude of power over the time range is expressed in relative units depending on the total power of the laser.

While it will be apparent that the invention herein disclosed is well calculated to achieve the benefits and advantages set forth, it will be appreciated that the invention is susceptible to modification, variation and change without departing from the spirit thereof.

What is claimed is:

1. A process for producing metal powder which comprises the steps of providing a supply of molten metal, introducing said molten metal in the form of a stream having a preselected cross sectional area into a chamber, directing a transversely excited laser beam in impinging relationship against said stream and controlling the pulse rate and power of said laser beam to effect a fragmentation of said stream into a plurality of molten droplets, cooling said droplets to effect a solidification thereof, and recovering the resultant metal powder product.

2. The process as defined in claim 1, wherein the cross sectional area of said stream is fixed within a range of about 0.0003 to about 1 square inch.

3. The process as defined in claim 1, wherein a plurality of lasers are directed in impinging relationship against the same portion of said stream at directions angularly spaced from each other.

4. The process as defined in claim 1, in which said stream is formed by the free gravitational fall of said molten metal through an orifice.

5. The process as defined in claim 1, in which the cooling of said droplets is accomplished during the free-fall of said droplets toward the bottom of said chamber.

6. The process as defined in claim 1, in which said stream is substantially continuous.

7. The process as defined in claim 1, in which said chamber is substantially devoid of any atmosphere having a vacuum of less than about 1 Torr.

8. The process as defined in claim 1, in which said chamber is filled with an inert argon gas atmosphere.

9. The process as defined in claim 1, in which said chamber is filled with air.

* * * * *